United States Patent [19]

Ohtsuki et al.

[11] Patent Number: 5,851,255

[45] Date of Patent: Dec. 22, 1998

[54] METHOD FOR MANUFACTURING LENS WITH LENS BARREL

[75] Inventors: Motohiko Ohtsuki; Kimihiro Kikuchi, both of Miyagi-ken, Japan

[73] Assignee: Alps Electric Co., Ltd., Tokyo, Japan

[21] Appl. No.: 815,877

[22] Filed: Mar. 10, 1997

[30] Foreign Application Priority Data

Mar. 18, 1996 [JP] Japan .................................. 8-87111

[51] Int. Cl.⁶ ............................. C03B 11/00; B29D 11/00; G02B 7/02

[52] U.S. Cl. ................................. 65/60.1; 65/37; 65/59.4; 65/60.2; 65/64; 65/102; 359/808; 359/811; 264/1.32

[58] Field of Search ............................. 65/37, 59.4, 60.1, 65/64, 102, DIG. 1, 60.2; 359/642, 808, 811, 503; 264/1.25, 1.32

[56] References Cited

U.S. PATENT DOCUMENTS

| | | |
|---|---|---|
| 3,427,703 | 2/1969 | Baade . |
| 4,162,826 | 7/1979 | Van Der Beck et al. . |
| 4,591,373 | 5/1986 | Sato ........................................... 65/102 |
| 4,797,144 | 1/1989 | DeMeritt et al. .......................... 65/102 |
| 4,929,265 | 5/1990 | Carpenter et al. ........................... 65/64 |
| 4,964,903 | 10/1990 | Carpenter et al. ......................... 65/102 |
| 5,274,502 | 12/1993 | Demerritt et al. ....................... 359/642 |
| 5,378,255 | 1/1995 | Ito .............................................. 65/64 |
| 5,573,565 | 11/1996 | Dalton et al. ............................. 65/59.4 |

*Primary Examiner*—Steven P. Griffin
*Attorney, Agent, or Firm*—Brinks Hofer Gilson & Lione

[57] ABSTRACT

A method for manufacturing a lens with a lens barrel having a stopper by forming a uniform optical function coating on both lens surfaces. The method includes the steps of forming a first optical function coating on one side of a lens material, then inserting the lens material into a lens barrel so that the surface coated with the first optical function coating will face the long barrel side of the lens barrel, press molding lens surfaces by heating the lens material over its softening point, and finally forming a second optical function coating on the lens surface facing the short barrel side of the lens barrel.

2 Claims, 3 Drawing Sheets

METHOD FOR MANUFACTURING LENS WITH LENS BARREL

BACKGROUND OF THE INVENTION

1. Field of the Invention

The present invention relates to a method for manufacturing a lens with a lens barrel and, more particularly, to a method for manufacturing a lens formed integrally with a lens barrel, coated with optical function coatings on both sides thereof.

2. Description of the Related Art

There has been a growing demand for optical telecommunications networks capable of transmitting and receiving a large volume of information. In this type of optical telecommunications, emergent rays from an light-emitting element such as a semiconductor laser are condensed by a condenser, then going into the core of an optical fiber to transmit a signal. As the condenser, a lens with a lens barrel has been well known, in which, to facilitate installation thereof into a module, a lens 53 is integrally incorporated in a metal lens barrel 52 as shown in FIG. 6. The condenser is coated on its surfaces with optical function coatings 54 and 55 by a depositing process. The optical function coatings 54 and 55 have an antireflection function to prevent oscillation of the semiconductor laser resulting from that the emergent rays from the semiconductor laser are reflected by the lens surface to go back into the semiconductor laser. Also the coatings have, beside the antireflection function, protective coating functions, such as water, acid and alkali resistance, to prevent lens burn likely to occur under adverse environment.

Next, a conventional method for manufacturing a lens 51 formed integrally with a lens barrel will be explained. First, a lens material is inserted into a metal lens barrel 52, heated by an unillustrated heater, and pressed to form lens surfaces through a transfer method, thus forming the lens material integrally with the lens barrel and lens surfaces at the same time. Thereafter, the aforementioned optical function coating 54 is formed by the procedure that, as shown in FIG. 7, a plurality of lens barrels 51 formed integrally with the lens are successively arranged in a depositing apparatus 40 within the range of angle θ2 from a depositing source 41, in which a material to be deposited is evaporated to form the optical function coating 54 on one surface of the lens. During the depositing operation, the lens barrels 51 formed integrally with the lens are placed at an inclination angle θ1 within the depositing apparatus 40 in order to obtain the optical function coatings 54 of uniform thickness. After the formation of the optical function coating 54 on one surface of the lens 53, the lens 53 is turned over and placed in a like manner within the depositing apparatus 40 to deposit the optical function coating 55 on the other side of the lens, thus forming the optical function coatings 54 and 55 on the lens surfaces.

In the lens with a lens barrel, to facilitate module assembling, there has been an increasing demand for use of such a type of lens in which the end portion of the lens barrel is extended as far as the position of focal point of the lens to provide an optical fiber positioning face of contact. In this type of lens with a lens barrel, there has also been such a demand for contracting the opening in one end of the lens barrel to provide a contracted opening portion for the lens for limiting incident and emergent rays to thereby gain a target efficiency of combination.

The increase in length of the lens barrel from the lens surface to the barrel end portion and the provision of the contracted portion in the lens barrel, however, has such a disadvantage that the lens barrel portion extended in the aforesaid depositing process will have a screening effect, which produces shade within the range of deposition; and because of the small-diameter opening of the lens barrel, the material to be deposited is hardly coated on the lens surface. The material to be deposited on the lens surface can not be deposited uniformly, resulting in nonuniform thickness of the optical function coating.

As a conceivable method a holder 60 of separate piece in which a stopper portion 64a and a contracted portion 68 are formed as shown in FIG. 8 is prepared, and the lens barrel 52 of the lens 51 integrally formed with the lens barrel previously mentioned is fixedly attached on this holder 60 by securing means such as welding. However, in such a method using the separate piece, an increased number of components are required, which will make the process complicated, resulting in a high cost and an increased accumulated error.

SUMMARY OF THE INVENTION

In view of the above-described disadvantages inherent in the heretofore known techniques, it is a first object of the present invention to provide a method for manufacturing a lens with a lens barrel having a stopper in which an optical function coating is formed uniformly on both lens surfaces.

It is a second object of the present invention to provide a method for manufacturing a lens with a lens barrel having a contracted portion in which an optical function coating is formed uniformly on both lens surfaces.

As means for obviating the above-described disadvantages, the first object of the present invention is accomplished by first means of the present invention comprising forming a first optical function coating on one surface of a lens material, inserting the lens material into a lens barrel so that the surface coated with the first optical function coating will face the long side of the lens barrel, heating the lens material above its softening point to press mold lens surfaces, and then forming a second optical function coating on the lens surface facing a short side of the lens barrel.

The second object of the present invention is accomplished by second means of the present invention comprising forming a first optical function coating on one surface of a lens material, inserting the lens material into a lens barrel as far as its stepped contact position for positioning so that the surface coated with the first optical function coating will face a small-diameter opening of the lens barrel, heating the lens material over its softening point to press molding lens surfaces, and then forming a second optical function coating on the lens surface facing a large-diameter opening of the lens barrel.

BRIEF DESCRIPTION OF THE DRAWINGS

The foregoing objects and other objects, as well as the actual construction and operation of the method according to the present invention, will become more apparent and understandable from the following detailed description thereof, when read in connection with the accompanying drawings, in which.

DESCRIPTION OF THE PREFERRED EMBODIMENTS

Figure 1:
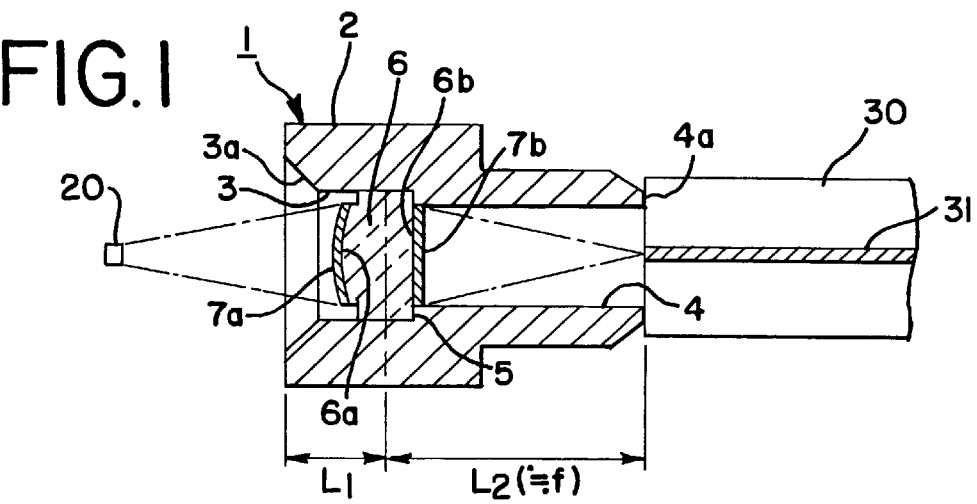
FIG. 1 is a sectional view of a lens with a lens barrel according to a first embodiment of the present invention.
Figure 2:
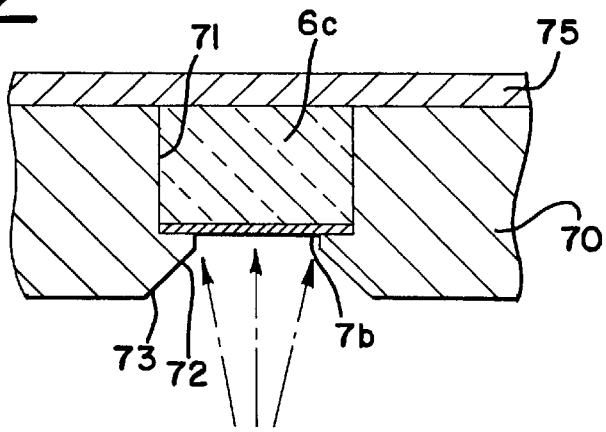
FIG. 2 is an explanatory view of a process for forming an optical function coating on a lens material for the lens with the lens barrel according to the embodiment of the present invention.
Figure 3:
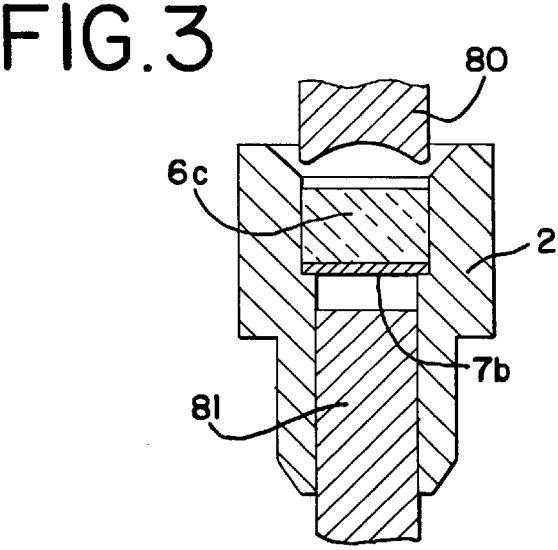
FIG. 3 is an explanatory view of a process for forming lens surfaces on the lens material for the lens with the lens barrel according to the first embodiment of the present invention.
Figure 4:
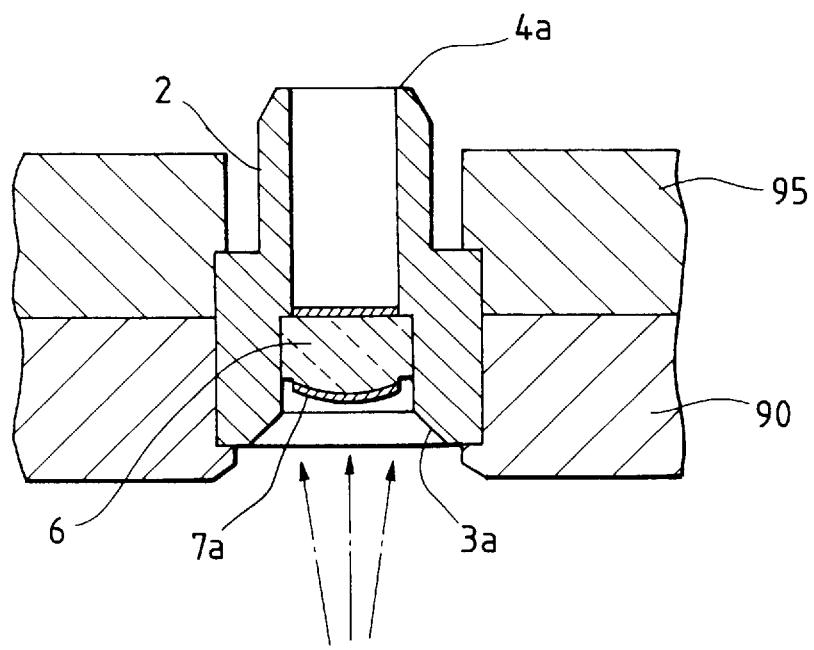
FIG. 4 is an explanatory view of a process for forming an optical function coating on the lens surface of the lens with the lens barrel according to the first embodiment of the present invention.
Figure 5:
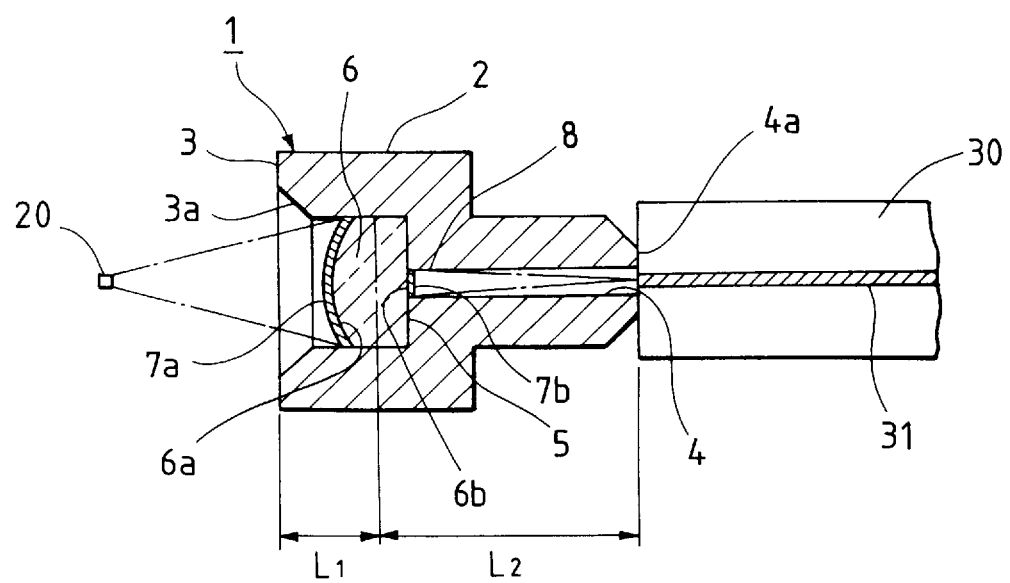
FIG. 5 is a sectional view of a lens with a lens barrel according to a second embodiment of the present invention.
Figure 6:
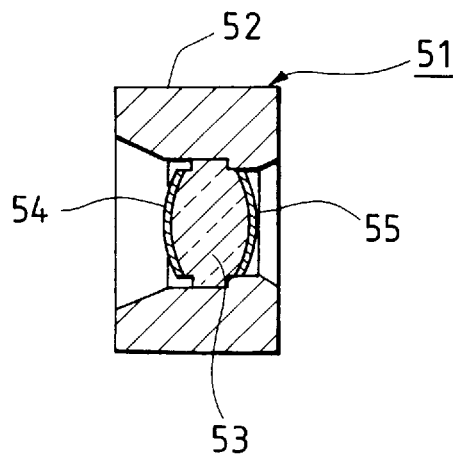
FIG. 6 is a sectional view of a conventional lens with a lens barrel.

Preferred embodiments of a lens with a lens barrel according to the present invention will hereinafter be explained in detail by reference to the accompanying drawings, in which FIG. 1 is a sectional view of a lens with a lens barrel of a first embodiment according to the present invention; FIG. 2 is an explanatory view showing a process for forming an optical function coating on a lens material for the lens with the lens barrel of the first embodiment; FIG. 3 is an explanatory view showing a process for forming a lens surface on the lens material for the lens with the lens barrel of the first embodiment; FIG. 4 is an explanatory view showing a process for forming an optical function coating on the lens surface of the lens with the lens barrel of the first embodiment; and FIG. 5 is a sectional view showing a lens with a lens barrel of a second embodiment according to the present invention.

A lens with a lens barrel 1 pertaining to the first embodiment of the present invention is formed of a lens 6 and a lens barrel 2 made of a hollow metal tube supporting the lens 6 therein and having openings 3 and 4 at its both ends. Inside this lens barrel 2 is provided a lens positioning stepped section 5 for holding the lens 6 in a position on one end side off a midpoint in the entire length of the lens barrel 2; therefore the length L1 of the left lens barrel of the lens differs from the length L2 of the right lens barrel. The lens 6 has a lens surface 6a on the short lens barrel L1 side and a lens surface 6b on the long lens barrel L2 side; on both lens surfaces later-described optical function coatings 7a and 7b are formed respectively. The end portion of the long lens barrel L2 is extended to a position nearly coinciding with the focal length f of the lens surface 6b, thereby forming a stopper section 4a. At the end of the opening 3 of the lens barrel 2 is provided an inclined portion 3a expanding outward from the inner wall of the lens barrel.

When the lens with the lens barrel having the stopper of the first embodiment according to the present invention is disposed between a semiconductor laser, such as a receptacle-type module, and an optical fiber, the short lens barrel L1 is placed oppositely to a semiconductor laser 20, while the long lens barrel L2 is disposed on the insertion port side of an optical fiber 30. In such an arrangement, when the optical fiber 30 is inserted until it contacts with the stopper section 4a of the long lens barrel L2, it is possible to condense the light reliably to the forward end position of the core 31 of the optical fiber 30 because the stopper section 4a has been extended by the same length as the focal length f from the lens surface 6b.

Next, the method for manufacturing the lens with the lens barrel according to the first embodiment of the present invention will be explained.

(First Process)

Figure 7:
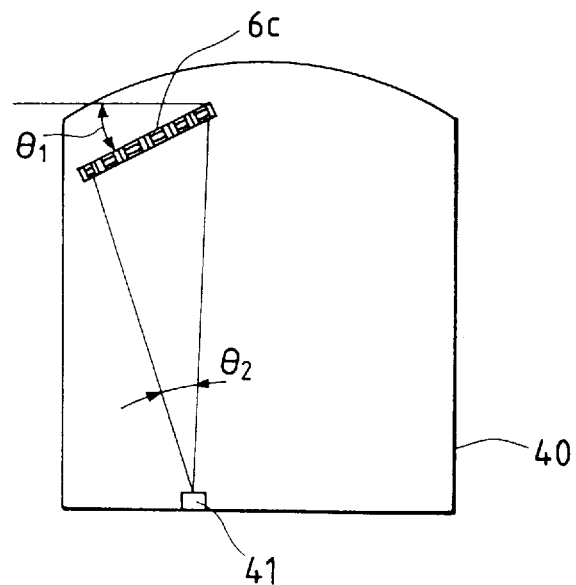
FIG. 7 is an explanatory view showing the arrangement of the lens with the lens barrel within a depositing apparatus.
Figure 8:
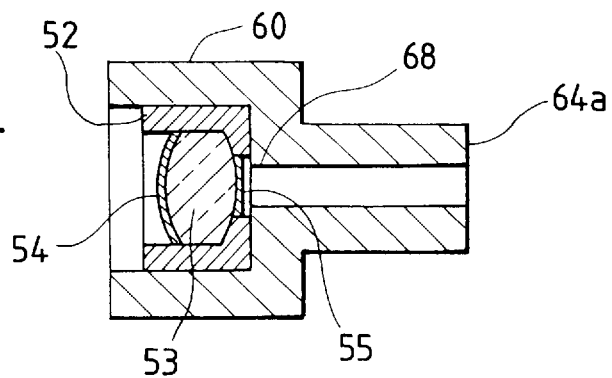
FIG. 8 is a sectional view of another conventional lens with a lens barrel.

First, as shown in FIG. 2, a lens material 6c of glass or the like is inserted into a hole 71 formed in a lower holder 70, and is placed on a holding claw 72 protruding from the inner wall section of the hole 71. The amount of protrusion of this holding claw 72 is set so that the lens material 6c will be exposed out more than the size of the lens positioning stepped section 5 of the lens barrel 2. A flat upper holder 75 is attached to cover the lens material 6c and the lower holder 70. A plurality of lens materials 6c are successively arranged in the depositing apparatus 40 within the range of angle θ2 from the depositing source 41 as shown in FIG. 7. Then, a material to be deposited is vaporized for depositing a first optical function coating 7b on the surface of the lens material 6c exposed from the hole 71 of the lower holder 70. During the depositing operation, the lens materials 6c are placed at an inclination angle θ1 in the depositing apparatus 40, and are driven to revolve by driving means. As the material of the optical function coating are used such antireflection film forming materials as $MgF_2$ and $SiO_2$. Here, at the lower end of the holding claw 72 there is provided an inclined surface 73 expanding outward. Since the outwardly protruding length from the lens material 6c is shorter, there is hardly produced shade within the range of deposition, thereby enabling uniform formation of the optical function coating. In the first process, the first optical function coating is formed in the aforesaid manner on one side of the lens material.

(Second Process)

Next, the lens material 6c is inserted into the opening 3 of the short lens barrel L1 until the first optical function coating 7b contacts with the lens positioning stepped section 5 of the lens barrel 2. Then, the lens barrel 2 and the lens material 6c are set in a pressing machine, heated over its softening point by unillustrated heating means such as a heater, and press molded by an upper die 80 and a lower die 81 both formed to have lens surface configurations, thereby transferring the lens surfaces 6a and 6b to the lens material. Since the transfer of the lens surface configurations is done after the formation of the first optical function coating 7b, it is necessary to prevent excessive elongation and shrinkage of the lens surface so that no peeling and damage of the optical function coating will occur. Concretely, if the optical function coating is formed of a single layer of $MgF_2$, it is desirable to hold elongation within the material ratio of 0% to 20%. In the second process, the lens material is integrally set in the lens barrel with the surface coated with the first optical function coating facing the lens positioning stepped section, to thereby form lens surfaces on the lens material.

(Third Process)

Next, after the lens barrel 2 formed integrally with the lens 6 is removed from the pressing machine, the lens 6 is supported with a lower holder 90 and an upper holder 95 as shown in FIG. 4, and placed inside the depositing apparatus 40 so that the lens surface 6a without an optical function coating will be exposed out on the depositing source 41 side. Then, similarly to the first process, a material to be deposited is vaporized within the depositing apparatus 40, depositing a second optical function coating 7a on the lens surface 6a to thereby form the lens 1 with the lens barrel. Here, since the inclined surface 3a expanding outward is provided at the end of the opening 3 of the lens barrel 2 and the length of outward protrusion from the lens surface 6a is short, shade is hardly produced at the time of deposition, thus enabling the uniform formation of an optical function coating. In the third process, the second optical function coating is formed on the other surface of the lens with the integral lens barrel, thus producing the lens with the lens barrel.

In the first embodiment of the present invention the optical function coating on the lens surface facing the long lens barrel provided with the stopper is preformed on one side of the lens material as described above, and then the lens material is inserted into the lens barrel to press mold the lens surfaces. It is, therefore, possible to form a uniform optical function coating on the lens surface on the long lens barrel side, making a reliable lens integral with a lens barrel having a stopper.

Next, the second embodiment of a lens with a lens barrel according to the present invention will be explained by reference to FIG. 5. Members common to those in the first embodiment are designated by the same reference numerals and will not be described. In the lens with a lens barrel of the second embodiment, a contracted portion 8 is provided between the lens surface 6b of the long lens barrel L2 and the stopper 4a to thereby shield a part of the optical path. Concretely, a small-diameter opening 4 is selected for a through hole communicating with the positioning stepped section 5 of the lens barrel 2 and at the same time the opening 4 is made smaller in bore size than the opening 3. Therefore a part of the emergent rays from the lens surface 6b is shielded by the contracted portion 8, then forming an image in the core 31 of the optical fiber 30. The lens with the lens barrel pertaining to the second embodiment is made by the same manufacturing method as that of the first embodiment.

After the lens material 6c is inserted into the lens barrel 2 until the surface of the lens material 6c coated with the first optical function coating 7b in the first process contacts with the positioning stepped section 5 facing the small-diameter opening 4 of the lens barrel 2, the lens surfaces 6a and 6b are formed on the lens material 6c. Thereafter, the second optical function coating 7a is formed on the other lens surface 6a facing the large-diameter opening 3 of the lens barrel 2 formed integral with the lens 6 in the third process, thereby forming the lens with the lens barrel.

In the second embodiment of the present invention, as described above, the optical function coating for the lens surface facing the contracted portion of the lens barrel is preformed on one side of the lens material, thereafter the lens material is inserted into the lens barrel and the lens surfaces are press molded. It is possible to form a uniform coating of optical function on the lens surface on the contracted portion side of the lens barrel, thus producing a lens with a lens barrel having a highly reliable aperture.

According to the first means, as heretofore explained, since the first optical function coating is formed on one side of the lens material, then the lens material is inserted into the lens barrel so that the surface coated with the first optical function coating will face the long lens barrel side, thereafter the lens material is heated up over its softening point and press molded to form lens surfaces, and the second optical function coating is formed on the lens surface facing the short lens barrel side, it becomes possible to form a uniform optical function coating on either surface of the lens, and to thereby provide a highly reliable lens with a lens barrel having a stopper.

Furthermore, according to the second means, the first optical function coating is formed on one side of the lens material, then the lens material is inserted to the position of contact with the positioning stepped section in the lens barrel so that the surface coated with the first optical function coating will face the small-diameter opening of the lens barrel, thereafter the lens material is heated up over its softening point to press mold lens surfaces, and the second optical function coating is formed on the lens surface facing the large-diameter opening of the lens barrel, thereby enabling the provision of a lens with a lens barrel having a reliable aperture and coated with uniform optical function coatings on both surfaces.

What is claimed is:

1. A method for manufacturing a lens with a lens barrel, comprising the steps of forming a first optical function coating on one side of a lens material, inserting said lens material into a lens barrel so that said one side coated with the first optical function coating will face a long lens barrel side, then press molding lens surfaces by heating said lens material over its softening point, and subsequently forming a second optical function coating on a lens surface facing a short lens barrel side.

2. A method for manufacturing a lens with a lens barrel, comprising the steps of forming a first optical function coating on one side of a lens material, inserting said lens material to a position of contact with a positioning stepped section in a lens barrel so that said one side coated with the first optical function coating will face a small-diameter opening of said lens barrel, thereafter press molding lens surfaces by heating said lens material over its softening point, and subsequently forming a second optical function coating on a lens surface facing a large-diameter opening of said lens barrel.

* * * * *

UNITED STATES PATENT AND TRADEMARK OFFICE
CERTIFICATE OF CORRECTION

PATENT NO. : 5,851,255
DATED : December 22, 1998
INVENTOR(S) : Motohiko Ohtsuki et al.

It is certified that error appears in the above-identified patent and that said Letters Patent is hereby corrected as shown below:

<u>In the Title Page</u>, Item [56],

In column 2, after line 3, insert a new line as follows:

--4,897,101  1/1990  Carpenter et al.  65/64--.

Signed and Sealed this

Sixth Day of July, 1999

Q. TODD DICKINSON

Attest:

*Attesting Officer*          *Acting Commissioner of Patents and Trademarks*